UNITED STATES PATENT OFFICE.

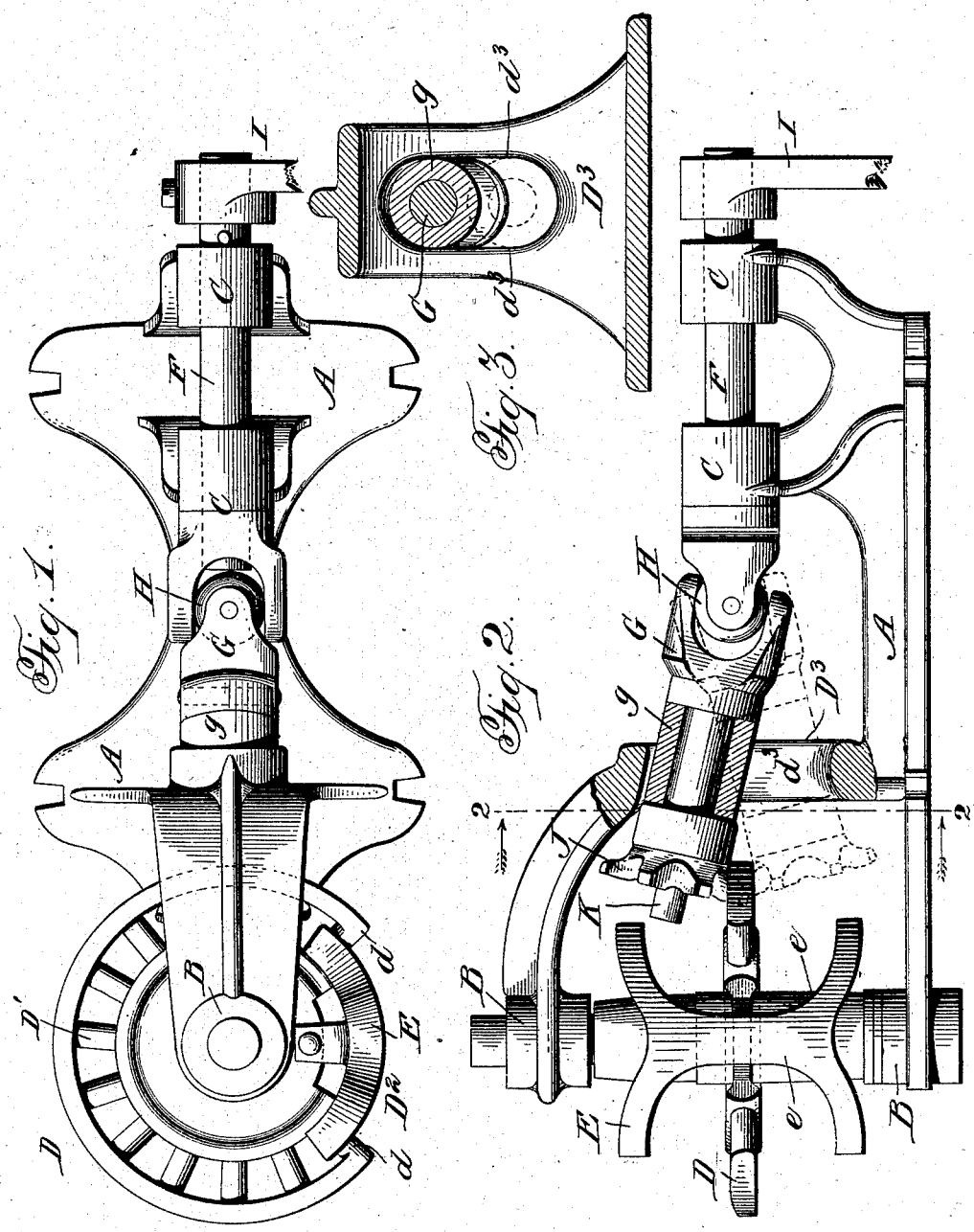

HENRY THEISSEN, OF DAVENPORT, IOWA, ASSIGNOR OF ONE-HALF TO EMIL R. ROHWEDDER, OF DAVENPORT, IOWA.

MECHANICAL MOVEMENT.

SPECIFICATION forming part of Letters Patent No. 718,033, dated January 6, 1903.

Application filed July 9, 1902. Serial No. 114,893. (No model.)

*To all whom it may concern:*

Be it known that I, HENRY THEISSEN, a citizen of the United States, and a resident of Davenport, in the county of Scott and State of Iowa, have made certain new and useful Improvements in Mechanical Movements, of which the following is a specification.

My invention is an improvement in mechanical movements, and has for an object to provide a novel construction whereby to convert continuous rotary movement into an oscillating or reciprocating rotary movement; and the invention consists in certain novel constructions and combinations of parts, as will be hereinafter described and claimed.

In the drawings, Figure 1 is a top plan view, and Fig. 2 a side elevation, partly in section, of an apparatus embodying my invention; and Fig. 3 is a detail cross-section on about line 3 3 of Fig. 2.

My invention is especially designed for use in machines such as washing-machines, where it is desired to give an oscillating movement to a beater or the like for cleaning the clothes; but the invention may be used in churns or otherwise wherever desired.

In carrying out the invention I provide a frame having a base A, provided with upright bearings B and B for the main shaft, horizontal bearings C C for the main section of the drive-shaft, and a vertically-elongated loop $D^3$, having a slot $d^3$, in which the adjusting end of the drive-shaft may move up and down and turn. This loop $D^3$ occupies a space about in line centrally between the upper and lower bearings B' and B for the main shaft, and on the main shaft between the said bearings B and B' is fixed the wheel D, which is in the form of a segmental or mutilated gear, having the teeth D' and broken away at $D^2$ and provided in the space between its adjacent ends $d$ with a double-faced guide E, whose opposite side edges are concave at $e$ and are arranged for engagement by the projecting pin or stud on the adjusting-section of the drive-shaft. A horizontally-extending rib is provided between the ends of the segmental gear, and the guide E is in the form of a double yoke, provided at its opposite edges with the connections E, which curve around the opposite ends of the segmental gear, and an inwardly-projecting lug is provided between said connections, which overlaps and is secured to the rib extending between the ends of the segmental gear, as will be understood from Fig. 1 of the drawings.

The drive-shaft comprises the main section F and what for convenience of reference I term the "adjusting-section" G, such sections F and G being universally jointed at H, so the section F may operate to turn the section G, and the latter may be free to turn with the section F and also to swing up and down at its free end or end opposite the joint H. The main section F of the drive-shaft is journaled in the bearing C, so it can turn therein, and may be turned by a handle I, as shown, or by any other means. The section G is jointed at H to the inner end of the section F, extends thence through the elongated guide $d$ in the frame, and is provided at its opposite or free end with the toothed pinion J to mesh with the wheel D, and has at such end the projecting pin or stud K, which engages with the inwardly curved or concave edges $e$ of the guide E. The section G, I provide on that portion which operates within the guide $d$ with a sleeve $g$, forming an antifriction-roller, to ease the movements of the parts and prevent friction of the shaft-section G within the frame, thereby easing both the rotary and up-and-down adjusting movements of the shaft-section G, as will be understood from Figs. 2 and 3 of the drawings.

In operation, motion being given the drive-shaft in any suitable manner, the shaft-section G will be turned and as it turns in engagement with the wheel D will turn such wheel until the pinion J reaches one end, $d$, of the segmental gear. At such time the pin or stud K will engage with the guide E, and if the pinion J be above the gear D, as shown in full lines, Fig. 2, the said guide will direct the pinion downward, so it will engage with the under side of the gear D, as indicated in dotted lines, Fig. 2, thus reversing the movement of the gear, and when the pinion J has reached the other end of the gear-segment its stud K will engage with the opposite guide edge $e$, and the pinion will be directed to the upper side of the gear D, and so on, the drive-shaft being turned continuously in one direction and the main shaft first in one and then in the opposite direction to produce the desired agitation by means of the devices connected with the main shaft.

Having thus described my invention, what I claim as new, and desire to secure by Letters Patent, is—

The mechanical movement substantially as herein described, comprising a segmental gear, a rib between the ends of said gear, a pinion meshing with said gear, a movable support for said pinion whereby the same may travel along the upper or under side of the gear, and a guide in the form of a double yoke secured to the gear between the adjacent ends of its toothed portion and having an inwardly-projecting lug secured to the rib of the gear and also having at its ends concaved curved seats extending at their ends in position to direct the pinion from side to side of the segmental gear at the ends of the toothed portion of the latter, substantially as set forth.

HENRY THEISSEN.

Witnesses:
ALOIS C. HECKLE,
ALFRED CLAUSSEN.